United States Patent [19]

Manning

[11] Patent Number: 4,776,623
[45] Date of Patent: Oct. 11, 1988

[54] APPARATUS FOR STORING AND TRANSPORTING CASSETTES

[76] Inventor: James A. Manning, 1710 NW. 193rd St., Miami, Fla. 33056

[21] Appl. No.: 49,851

[22] Filed: May 15, 1987

[51] Int. Cl.⁴ .................... A47B 81/06; A47F 7/00
[52] U.S. Cl. .................... 294/143; 206/387; 211/40; 224/42.45 R; 294/159; 294/169
[58] Field of Search ............. 294/27.1, 32, 87.1, 294/137, 141–144, 146, 159, 161–163, 165, 167, 169; 206/387, 449, 454–456; 211/13, 40, 41, 126, 134; 224/42.01, 42.45 R, 42.46 R, 273, 277; 312/8–15, 244, 245

[56] References Cited

U.S. PATENT DOCUMENTS

| | | | |
|---|---|---|---|
| 3,443,851 | 5/1969 | Earl | 312/245 |
| 3,710,900 | 1/1973 | Fink | 312/10 X |
| 3,907,116 | 9/1975 | Wolf et al. | 211/40 |
| 4,081,119 | 3/1978 | Messmore | 206/454 |
| 4,257,524 | 3/1981 | Yonkers et al. | 211/13 X |
| 4,270,817 | 6/1981 | McRae | 312/15 |
| 4,293,075 | 10/1981 | Veralrud | 211/40 |
| 4,396,123 | 8/1983 | Swan | 211/40 |
| 4,425,012 | 1/1984 | Kley | 312/245 X |
| 4,491,257 | 1/1985 | Ingles | 224/42.45 R |

FOREIGN PATENT DOCUMENTS

| | | | |
|---|---|---|---|
| 342892 | 1/1960 | Switzerland | 224/42.46 R |
| 1503568 | 3/1978 | United Kingdom | 312/9 |

Primary Examiner—Johnny D. Cherry
Attorney, Agent, or Firm—John H. Faro

[57] ABSTRACT

Apparatus for storing and transporting cassettes comprising a container formed of side panels and a rear panel coupled to form a box-like structure. The container also includes a plurality of spaced and parallel separation panels forming slots for individual cassettes to be inserted, stored and removed. The apparatus also includes a bracket formed as an inverted J-shaped member having a short downwardly extending part positionable between an internal door panel and its associated glass and a long downwardly extending part. A tongue is also provided on the container and pockets on the long part of the bracket to separably couple the container to the bracket. The separation panels may be oriented either generally horizontally or vertically.

3 Claims, 2 Drawing Sheets

APPARATUS FOR STORING AND TRANSPORTING CASSETTES

BACKGROUND OF THE INVENTION

1. Field of the Invention

This invention relates to the storage and transportation of cassettes and, more particularly, to apparatus for removably storing audio cassettes in containers, for retaining the container in a predetermined location and for separating the container from the bracket so that the container with its cassettes may be transported independent of the bracket for use at a remote location.

2. Description of the Background Art

In recent years there has been a great increase in popular music as well as audio cassettes for playing such music. Whether popular music has caused the increase in cassettes and cassette players or whether the availability of cassettes and cassette players has promoted the popularity of music, does not matter. Cassettes and their players are in increasingly wide use today.

Cassette players may be designed for use at any one of a wide variety of locations. Cassette players with large speakers are more adapted for use in a particular room of a home. In dash or under dash cassette players are found in a large number of cars today. In addition, personal cassette players are also not uncommonly utilized by people walking among the general public. Such public systems may have private earphones for the listening enjoyment solely by a wearer while other personal systems might be hand carried with an audio range for being heard by other people in the proximate area. The proliferation of cassettes and their players has become a reality.

Cassettes are normally kept individually in transparent cases, and with the increase in their numbers, there has come an increase in the number of containers for storing such cassettes and cases. Such storage containers are available in a wide variety of designs as a function of the location at which their cassettes are to be utilized. Containers for use in supporting cassettes for a large fixed player in a home would be different in design from a container design for use in association with a player in a car which, in turn, would be different from a container designed for use in association with a personal player carried by a listener.

Cassette containers should be designed for individually storing the listener's favorite cassettes in such a way as to allow for the easy insertion and removal of the cassettes from the storage container. They should also be designed for the convenient viewing of any writing on either the cassettes or their cases. Further, they should be designed for being conveniently transported between various locations where they might be used. In addition, they should be as attractive and economical as possible.

The patent literature shows that these design objectives are well recognized. It does not, however, provide any satisfactory solution which is sufficiently convenient, economical and attractive. Consider, for example, U.S. Pat. Nos. 3,907,116 to Wolf; 4,293,075 to Veralrud; and 4,306,655 to Smith. These three patents describe containers for the removal receipt of various types of audio cassettes as well as video cassettes. The containers are all of complex, expensive constructions with excessively large numbers of component parts which would tend to increase their costs for materials and labor. They are all generally designed for being positioned adjacent to a cassette player and then transported to another location by the user. Further, no provision is made for their securement at a particular location. In addition, their sizes are generally such that they might accommodate any one of a plurality of sizes or types of cassettes.

Similar to the disclosures of the above discussed patents are the French Patent No. 2,301,413 issued Oct. 22, 1976 in the name of Rolland and the West German Patent Number DT 2630-451 issued Feb. 2, 1978 to Wittner. These patents disclose cassette containers for audio or visual purposes. These containers may be mounted for use in passenger compartments of cars. Both devices are of complex, expensive, designs and may include the cassette player itself in combination with the cassete storage container.

Also of interest are U.S. Pat. Nos. 3,510,008 to Mason; 3,627,398 to Reese; 4,111,502 to Kessler and 4,285,557 to Paladino. These four patents disclose devices for removably containing cassettes wherein the devices are designed for permanent attachment to a part of a car. The Reese and Paladino devices include complex linkage mechanisms wherein the cassette carrying portion of the devices may be swung between an upper position for storage and a lower position wherein the cassettes may be inserted or removed. The Mason device is simply constructed of a permanently bolted receptacle and a depending portion in which the cassettes may be received. The most complex and expensive cassette storage device would appear to be that described by Kessler. According to the Kessler disclosure, the individual cassettes are stored in individual drawers in such a manner that any written material on the cassette indicative of its contents is not normally visible by the user.

Additional arrangements of cassette containers are those described in U.S. Pat. Nos. 4,180,299 to Tolerson and 4,231,625 to Perez. These two patents each describe a cassette carrier mountable in a car wherein a first portion of the device is removable from a permanently attached second portion. Both of the devices, like the devices disclosed by Mason, Reese, Kessler and Paladino discussed in the immediately preceding paragraph, require the permanent defacing of the car by bolts, screws or the like. According to the Tolerson disclosure, the cassettes would not be conveniently observable nor could they be stored or retrieved unless their container were pivoted to a lower position. While the Perez cassettes would be visible at all times, the Perez apparatus is an expensive and complex combination of parts including lights coupled with the electrical system of the car and with separate handles which might be used when the cassette carrying portion of the apparatus is removed from the car in which it is mounted.

The mounting of devices on ledges such as those found in cars, for more convenient attachment and removal, is disclosed in U.S. Pat. Nos. 1,746,634 to Breneman; 3,125,969 to Tallon; 3,409,193 to Metcalf and 3,804,233 to Gregg. These patents describe unitary, not separable, devices for their convenient coupling, as to a car window, for example. The devices are one-piece arrangements with no ability to separate a first attaching portion from a second article carrying portion which might be separated and transported from the first attaching portion. None of these prior patents or known commercial devices teaches or suggests the convenient, economical and attractive container as described and claimed herein. Known containers are simply lacking in one regard or another.

As illustrated by the great number of prior patents and commercial devices, efforts are continuously being made in an attempt to more conveniently, economically and attractively store and transport audio cassettes. None of these prior art efforts, however, suggests the present inventive combination of component elements arranged and configured as disclosed and claimed herein. Prior techniques and apparatus do not provide the benefits attendant with the present invention. The present invention achieves its intended purposes, objectives and advantages over the prior art devices through a new, useful and unobvious combination of component elements, through the use of a minimum number of functioning parts, at a reduction in cost to manufacture, and through the utilization of only readily available materials.

These objects and advantages should be construed as merely illustrative of some of the more prominent features and applications of the present invention. Many other beneficial results can be attained by applying the disclosed invention in a different manner or by modifying the invention within the scope of the disclosure. Accordingly, other objects and advantages as well as a fuller understanding of the invention may be had by referring to the summary and detailed description of the preferred embodiments of the invention in addition to the scope of the invention as defined by the claims taken in conjunction with the accompanying drawings.

SUMMARY OF THE INVENTION

The present invention is defined by the appended claims with the specific preferred embodiments shown in the attached drawings. For the purposes of summarizing the invention, the invention may be incorporated into an apparatus for storing and transporting cassettes. The apparatus comprises a container formed of side panels and a rear panel coupled to form an interior cavity. The container also includes within the interior cavity a plurality of parallel separation panels which form slots for the insertion, storage and removal of individual cassettes. The apparatus also includes a bracket formed is an inverted J-shaped configuration having a short downwardly extending part and a long downwardly extending part positionable on opposite sides of a supporting member. The apparatus also includes coupling means on the container and on the bracket to removably couple the container to the bracket. The container, bracket and coupling means are all fabricated of a transparent plastic. The apparatus further includes handle means pivotably secured on the exterior faces of the side panels rotatable between a downwardly oriented vertical rest position and an upwardly oriented vertical carrying position. The apparatus further includes crescent shaped stop members on the exterior faces of the side panels in operative association with the handle means to limit its rotational movement between the vertical rest position and the vertical carrying position. The coupling means on the container includes tongue means projecting downwardly from the exterior face of the rear panel. The coupling means on the bracket includes pocket means with horizontally disposed slot means at the upper end thereof. The coupling means may include a plurality of vertically spaced tongue means on the container projecting downwardly from the exterior face of the rear panel and a plurality of vertically spaced horizontally disposed slots on the bracket of a size to receive the tongue means. The lower edges of the side and rear panels form a surface for supporting the container when not coupled with the bracket.

In the primary embodiment, the separation panels are located with their side edges coupled with the side panels and with their rear edges coupled with the rear panel. The separation panels are oriented generally horizontally but with their front edges elevated with respect to their rear edges. The central portions of the separation panels include cut out areas in their central extents. The apparatus further includes recessed portions in the upper faces of the separation panels adjacent the cut out areas. The apparatus further includes upturned lips on the exterior edges of the separation panels. In the alternate embodiment, the separation panels may be oriented vertically with their rear edges coupled with the rear panel. The apparatus further includes a lower panel coupled at its side and rear edges to the side and rear panels and with the lower edges of the separation panels coupled to the lower panel. The apparatus further includes an abbreviated front panel extending upwardly from the front edge of the lower panel and coupled to the lower extents of the front edges of the separation panels. The apparatus further includes a plurality of spring means on the interior face of the back panel between the separation panels to urge received cassettes toward the front panel.

In addition, the invention may also be incorporated into an assembly for storing and transporting audio cassettes. The assembly comprises a container formed of generally rectangular, spaced, parallel side panels and a generally rectangular rear panel coupled to the side panels along their rear edges to form a box-like structure with an open interior. The container also includes a plurality of spaced and parallel separation panels with rear edges coupled to the interior face of the rear panel defining slots in which cassettes may be inserted, stored and removed. The container also includes tongue means positioned on the exterior face of the rear panel. The assembly also comprises a bracket. The bracket includes a horizontally extending intermediate part of a length to be positioned over an internal door panel of a car, a vertically extending short part having an upper end depending from one end of the intermediate part adapted to be positioned between an internal door panel and its associated glass, and a vertically extending long part having an upper end depending from the other end of the intermediate part adapted to be positioned within a car on its interior door panel. The long part has a plurality of pockets of a size to receive the tongue means of the container for the removable coupling of the container to the bracket. In one embodiment, the separation panels are generally horizontally oriented with their side and rear edges coupled to the side and rear panels. In another embodiment, the separation panels are located vertically with their rear edges coupled with the rear panel and further including a lower panel with the lower edges of the separation panels coupled to the lower panel and further including an abbreviated front panel extending upwardly from the front edge of the lower panel and coupled to the lower extents of the front edges of the separation panels.

The foregoing has outlined rather broadly the more pertinent and important features of the present invention in order that the detailed description of the invention that follows may be better understood whereby the present contribution to the art may be made fully appreciated. Additional features of the invention will be described hereinafter which form the subject of the claims of the present invention. It should be appreciated by those skilled in the art that the conception and the specific embodiments disclosed herein may be readily utilized as a basis for modifying or designing other apparatus for carrying out the same purposes of the present invention. It should also be realized by those skilled in the art that such equivalent apparatus do not depart from the spirit and scope of the invention as set forth in the appended claims.

BRIEF DESCRIPTION OF THE DRAWINGS

For a more complete understanding of the nature, objects and advantages of the present invention, reference should be had to the following detailed description taken in conjunction with the accompanying drawings.

Similar refreence numerals refer to similar parts throughout the several Figures.

DETAILED DESCRIPTION OF THE INVENTION

Figure 1:
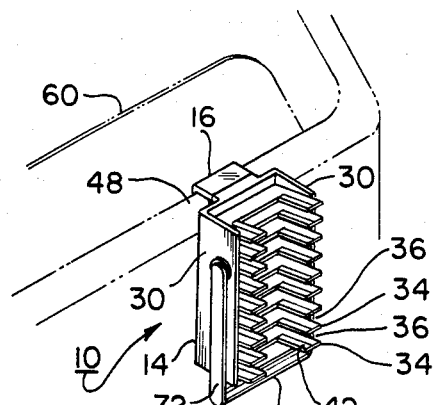
FIG. 1 is a perspective illustration of the cassette storing and transporting assembly constructed in accordance with the primary embodiment of the invention including the car parts upon which it is mounted for use.
Figure 2:
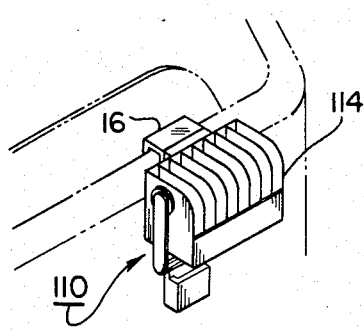
FIG. 2 is a perspective illustration of the cassette storing and transporting assembly constructed in accordance with the alternate embodiment of the invention including the car parts upon which it is mounted for use.

Shown in FIGS. 1, 3, 4, 5 and 6 is an assembly or apparatus 10 for the removable storage and transportation of audio cassettes 12. This assembly is constructed in accordance with the primary embodiment of the present invention and includes the combination of a container 14, a bracket 16 and separable coupling components 18. The coupling components include tongues 22 on the container 14 and pockets 24 on the bracket 16.

The audio cassettes 12 of the type to be stored and transported in accordance with the principles of the present invention include magnetic tape supported in a rigid plastic housing. The housing is generally imprinted to indicate the contents of its tape. Each cassette is normally removably encased in a protective case 26 of rigid transparent plastic. Like the cassettes 12, the cases 26 may also be provided with markings to indicate the contents of its tape.

Figure 3:
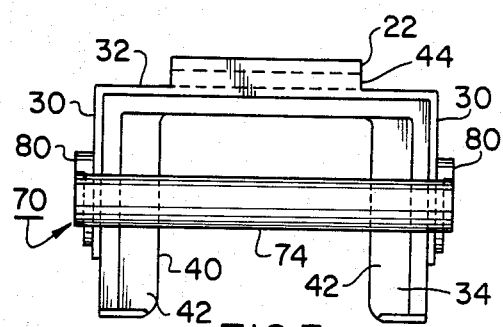
FIG. 3 is a plan view of the container, per se, as illustrated in FIG. 1.
Figure 5:
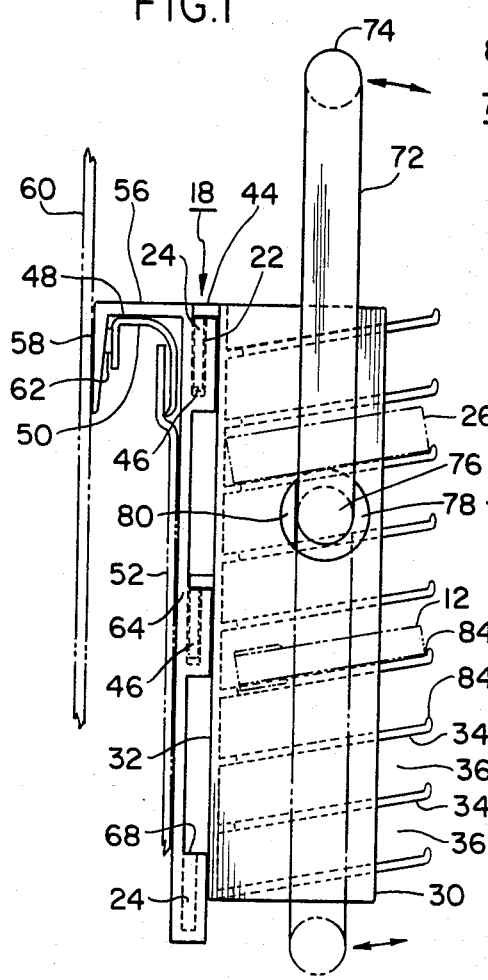
FIG. 5 is a side elevational view of the container and bracket as illustrated in FIG. 1 including the car parts upon which it is mounted for use.
Figure 4:
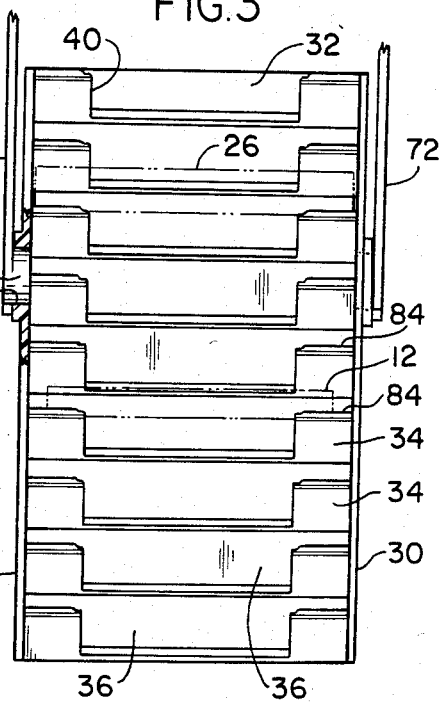
FIG. 4 is a front elevational view of the container, per se, as illustrated in FIGS. 1 and 3.
Figure 6:
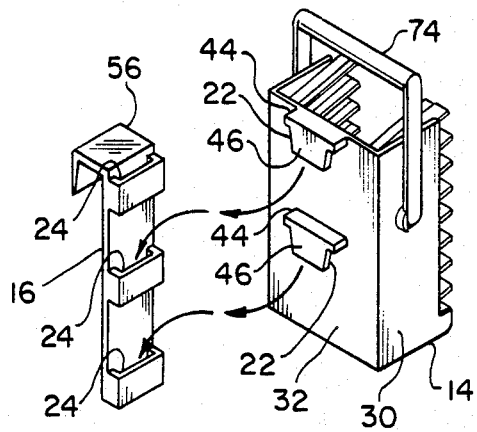
FIG. 6 is an exploded perspective illustration of the cassette storing and transporting assembly constructed in accordance with the primary embodiment of the invention with the container and bracket separated and with arrows indicating a method of coupling.
Figure 7:
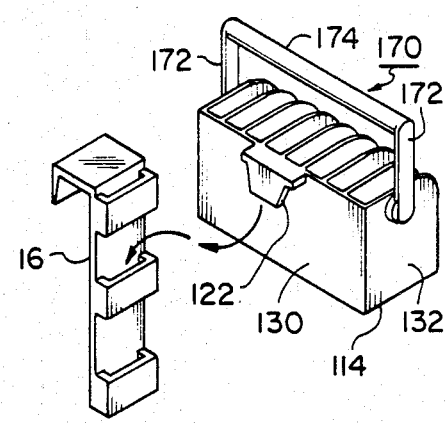
FIG. 7 is an exploded perspective illustration of the cassette storing and transporting assembly constructed in accordance with the alternate embodiment of the invention with the container and bracket separated and with arrows indicating a method of coupling.
Figure 8:
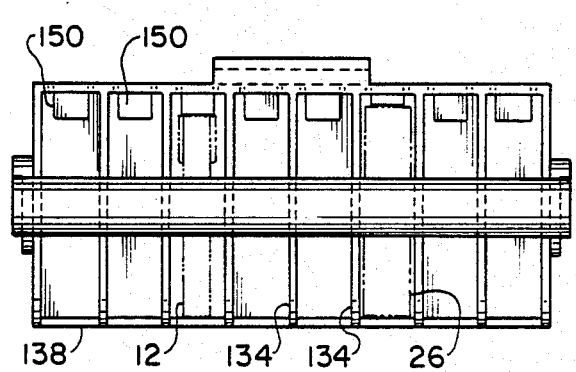
FIG. 8 is a plan view of the container, per se, as illustrated in FIG. 2 and 6.
Figure 10:
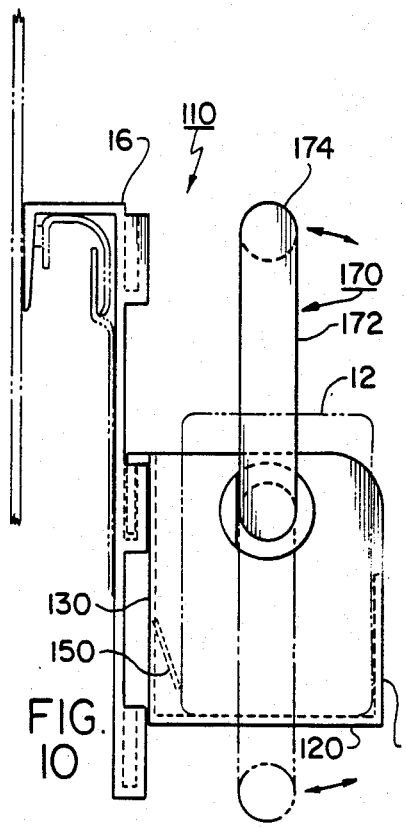
FIG. 10 is a side elevational view of the container and bracket as illustrated in FIGS. 2 and 6 including the car parts upon which it is mounted for use.
Figure 9:
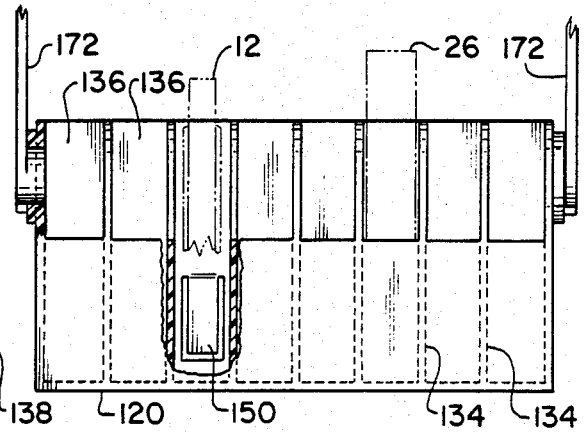
FIG. 9 is a front elevational view of the container, per se, as illustrated in FIGS. 2, 6 and 7.

As can be more readily seen in FIGS. 3 through 5, the container 14 is formed of generally rectangular side panels 30 of identical size and shape. The side panels 30 are integrally formed or otherwise coupled together with a rectangular rear panel 32. The side panels have front edges which form an opening at the front of the container.

Within the interior of the container and extending between the side panels, which are essentially vertical in orientation, are a plurality of generally horizontally disposed, rectangular separation panels 34. Their side edges are formed integrally with or otherwise coupled with the interior faces of the side panels 30. The rear edges of the separation panels are integrally formed or otherwise coupled with the interior face of the rear panel 32. When viewed together, a plurality of slots 36 are thus formed at the front of the container 14 for the selective insertion, storage and removal of cassettes 12 with or without their cases 26 in such a generally horizontal orientation so that their labels may be readily read during storage and so that they may be conveniently inserted and removed. These slots are defined at their front edges by the forward edges of the separation panels and the side panels, and at their sides by the side panels and at their rear by the interior face of the rear panel. As used herein, the term "interior" is intended to mean in the direction facing the space between the various panels of the container. Conversely, the term "exterior" is intended to mean in the direction facing away from the interior.

The individual separation panels 34 are formed with cut out areas 40 in their central extents extending rearwardly from their front edges to a location short of the rear panel whereby their upper surfaces merely receive and support the sides and rear portions of a cassette case. Along the side edges of the supporting surfaces facing the cut out areas are recesses 42. The recesses 42 are of such size and location that they may support and centrally position the side edges of cassettes when inserted and stored without their cases.

Located on the exterior face of the rear panel 32 are spaced downwardly extending tongues 22 having a horizontal portion 44 extending away from the container for a short distance generally corresponding to the thickness of the material used in fabricating the container 14 and bracket 16. The tongues 22 then have downwardly extending portions 46, vertically spaced from each other, and extending a distance less than the height of the container. Their operation and use will be described in detail hereinafter.

The apparatus or assembly of the present invention includes the container 14 as described above, a bracket 16 and their coupling components 18 adapted to removably couple the container to the bracket. The bracket is configured for its removable coupling with an essentially horizontal ledge 48 such as a portion of a car. Note FIGS. 1 and 5. The ledge is preferably that portion of a car adjacent the top edge of the door frame 50 extending upwardly from an interior door panel 52.

The bracket 16 is formed in an inverted J-shaped configuration. An intermediate horizontal part 56 extends away from the container a distance substantially equal to the thickness of an interior door panel and frame over which it is received. Downwardly extending from the one end of the horizontal part 56 is a short vertical part 58 adapted to be received between the glass 60 of a door window and its adjacent inner door panel 52, frame 50 and weather stripping 62. Its lower end is tapered to facilitate its positioning. Downwardly extending from the other end of the horizontal part 56 is a long vertical part 64 adapted to be positioned adjacent the inner door panel 52. On one face of the longer vertical part 64 of the bracket are a plurality, three in the primary embodiment, of pockets 24 each haivng a horizontal aperture 68 at its upper edge. The apertures are of such length and the pockets of such depth, so as to receive the tongues 22 formed on the exterior face of the rear panel 32 as described above. The tongues may be placed in any of the pockets whereby the height of the container may be at any one of four elevations for the convenience of the user. When positioned at one of the two higher elevations, the lower exterior portion of the rear panel will receive support from the unused pocket thereadjacent.

The pockets formed in the bracket, in combination with the tongues on the interior face of the container, constitute the coupling components 18, whereby the container may be easily coupled and uncoupled with respect to the bracket. Because of this arrangement, the bracket may be supported in its intended position adjacent the car window, whether opened or closed, while the container, with or without cassettes, may be removably positioned on the bracket or removed therefrom for being transported to a location in association with another cassette player.

The transporting of the container between locations is facilitated by a handle 70. The handle has side supports 72 and a gripping portion 74 formed between the exterior ends of the side supports. The interior ends of the side supports are provided with circular, inwardly directed projections 76 received in circular recesses of plates 78 formed on the exterior surfaces of the side panels. Rotation of the handle between a downwardly extending vertical rest position and an upwardly extending vertical carrying position is effected by the rotation of the circular projections within the circular recesses. In addition, a crescent shaped stop member 80 formed in each projection limits the rotation to the desired proper amount. Note the two positions of the handle in FIG. 5.

Note is taken that the separation panels of the container are rectangular, but are inclined downwardly away from the opening. In other words, these separation panels have their rearward edges at a lower elevation than their forward edges. With this arrangement, there will be a reduced tendency of any contained cassette or case from inadvertently falling from the container. In addition, retention of a cassette or case within the opening of the container is further insured by a small upwardly extending lip 84 at the forward end of each separation panel. A slight lift must, therefore, be given to any cassette or case as its removal is initiated. Further, the forward ends of the separation panels extend forward of the side panels for greater economy of materials as well as facilitating the grasping of a particular cassette by the user for removal.

The alternate or secondary embodiment of the invention is an apparatus or assembly 110 shown in FIGS. 2, 7, 8, 9 and 10. This embodiment is adapted to support the cassettes 12 and cases 26 in a vertical rather than generally horizontal orientation. The bracket is identical with that of the primary embodiment. The container 114, like that of the primary embodiment, includes a rear 130 and side panels 132 formed or otherwise coupled together, but it is also provided with a lower panel 120 and an abbreviated front panel 138. The separation panels 134 are vertically oriented for providing vertical slots 136 for supporting and retaining the cassettes and cases. The separation panels are formed integrally with, or otherwise secured to, the rear panel at their rear edges, to the lower panel at their lower edges, and to the front panel at the lower extents of their front edges.

The interior face of the rear panel is provided with integrally formed leaf springs 150 located between the separation panels. These springs act to apply a force to any received cassette or case in a slot. The force will tend to urge the cassette or case forwardly into positive contact with the interior face of the front panel to further insure the retention thereof within the container.

The container of the second embodiment is also provided with a handle 170 similar to that of the primary embodiment. But since the height of the second container is less than the first and its width greater, as can be seen by comparing the Figures, the side supports 172 are shorter while the gripping portion 174 is longer. The difference in size between the containers is such that the second embodiment apparatus is only provided with a single tongue 122. Because of this, the container may only be coupled with the bracket in one of three, rather than four positions.

Because of the arrangement of assembled parts in both the primary and secondary embodiment including container and bracket, each container may readily be separated from its bracket and transported without the removal of their bracket from the car. The bracket may, however, be removed and transported from car to car or even stored when it is desired that the container be utilized as an independent item of utility. Additionally, the side and rear panels form a flat rectangular surface so that when removed from the bracket, the container may be rested on any flat, generally horizontal surface. Each cassette 12 is normally encased in a protective case 26 of rigid transparent plastic about 11/16th inch in height, about 4¼ inches in width and about 2¾ inches in depth. As a result, the individual slots for the retention of the individual cases in which the cassettes are stored should be of such a size as to conveniently receive the individual cases with cassettes and to allow them to be conveniently inserted and removed. The various panels of the container can readily be dimensioned to form slots of such size. The cassettes within the cases are proportionately smaller than the cases in which they are received. Consequently, the recesses in the separation panels of the first embodiment are of such a size so as to accommodate the cassattes. Lastly, the number of slots for receiving cassettes may readily be varied to accommodate a larger or smaller number of cassettes than the six as disclosed hereinabove in the primary preferred embodiment.

In order to allow a user to read any information on a stored cassette or its case, the entire container is preferably molded or otherwise fabricated of a transparent material. A preferred material is transparent plastic which not only allows for the transparency but is of sufficient rigidity and strength to provide a long life of utility and attractiveness to the container. Other high polymer plastics could readily be utilized for the cassette. Similarly, the bracket is preferably formed of the same material as the container for the overall attractiveness and durability of the assembly.

In operation and use, a user would first insert the bracket over the inner panel of the car with its short part projecting downwardly between the window glass and the adjacent door parts. The longer vertical part would extend downwardly along the interior face of the door panel. Horizontal apertures and vertically extending pockets would be provided for the receipt of a container. Positioning the bracket over other support surfaces with ledge-like members is likewise possible. The user would then removably couple the container to the bracket by passing the free or lower ends of the tongues into the appropriate apertures of the bracket and the pockets as a function of the height desired for the container and cassettes. The user could readily adjust the height to suit his or her preference depending upon which tongues and pockets are selected. The coupling of the container to the bracket could, of course, be done prior to coupling the bracket to the door. Whether or not the container is secured to the bracket, the user could then insert cassettes or cases into the openings in any particular sequence desired as a function of the cassette intended to be played. Thereafter, the container and its tongues would be lifted from the pockets of the brackets and the container removed from the bracket whereby the container, with or without cassettes, could be transported to another location for use. In addition, the bracket could be lifted out of its operative position in association with the interior door panel of a car for its relocation or storage.

The present disclosure includes that information contained in the appended claims as well as that in the foregoing description. Although the invention has been described in its preferred forms or embodiments with a certain degree of particularly, it is understood that the present disclosure of the preferred form has been made only by way of example and that numerous changes in the details of construction, fabrication and use, including the combination and arrangement of parts and method steps, may be resorted to without departing from the spirit and scope of the invention.

What is claimed is:

1. An assembly for storing and transporting audio cassettes comprising, in combination:
    a container formed of generally rectangular, spaced, parallel side panels and a generally rectangular rear panel coupled to the side panels along their rear edges to form a box-like structure with an open interior, the container also including a plurality of spaced and parallel separation panels with rear edges coupled to the interior face of the rear panel defining slots in which cassettes may be inserted, stored and removed, the container also including tongue means positioned on the exterior face of the rear panel; and
    a bracket including a horizontally extending intermediate part of a length to be positioned over an internal door panel of a car, a vertically extending short part having an upper end depending from one end of the intermediate part adapted to be positioned between an internal door panel and its associated glass, and a vertically extending long part having an upper end depending from the other end of the intermediate part adapted to be positioned within a car on its interior door panel, the long part having a plurality of pockets at different elevation locations, any of which is adapted to receive the tongue means of the container for the removable coupling of the container to the bracket at any one of a plurality of elevational locations and further including handle means pivotally secured to the sides of the side panels at a central location to allow their pivoting to above or below the assembly.

2. The assembly as set forth in claim 1 wherein the separation panels are generally horizontally oriented with their side and rear edges coupled to the side and rear panels.

3. The assembly as set forth in claim 1 wherein the separation panels are located vertically with their rear edges coupled with the rear panel and further including a lower panel with the lower edges of the separation panels coupled to the lower panel and further including an abbreviated front panel extending upwardly from the front edge of the lower panel and coupled to the lower extents of the front edges of the separation panels.

* * * * *